United States Patent
Song

(10) Patent No.: US 7,450,639 B2
(45) Date of Patent: Nov. 11, 2008

(54) ADVANCED NOISE ESTIMATION METHOD AND APPARATUS BASED ON MOTION COMPENSATION, AND METHOD AND APPARATUS TO ENCODE A VIDEO USING THE SAME

(75) Inventor: Byung-cheol Song, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1055 days.

(21) Appl. No.: 10/704,537

(22) Filed: Nov. 12, 2003

(65) Prior Publication Data

US 2005/0013378 A1 Jan. 20, 2005

(30) Foreign Application Priority Data

Jan. 2, 2003 (KR) ............... 10-2003-0000046

(51) Int. Cl.
*H04B 1/66* (2006.01)
(52) U.S. Cl. ............... 375/240.12; 375/240.07; 375/240.06; 375/240.16; 375/240.15; 375/240.14; 382/238; 382/239; 382/264
(58) Field of Classification Search ............ 375/240.12, 375/240.07, 240.06, 240.16, 240.15, 240.14; 382/238, 239, 264
See application file for complete search history.

(56) References Cited

U.S. PATENT DOCUMENTS 5,978,518 A * 11/1999 Oliyide et al. .............. 382/260

2001/0033692 A1 * 10/2001 Borneo et al. .............. 382/205

FOREIGN PATENT DOCUMENTS

| DE | 42 21 236 | 1/1994 |
|---|---|---|
| DE | 4221236 | 1/1994 |
| EP | 0 712 554 B1 | 5/1996 |
| EP | 0 731 601 | 9/1996 |
| EP | 0 809 409 | 11/1997 |
| JP | 06-224773 | 8/1994 |
| WO | 95/24785 | 9/1995 |

OTHER PUBLICATIONS

Kim et al., "Efficient block-based coding of noisy images by combining pre-filtering and DCT", Electronics Letters, Sep. 30, 1999, vol. 35, No. 20.
Song et al., "Motion-Compensated Noise Estimation for Efficient Pre-Filtering in a Video Encoder", IEEE, 2003, pp. 211-214.
European Search Report issued Jun. 17, 2005 in the European Patent Application No. 03029460.7 which corresponds to U.S. Appl. No. 10/704,537.
Chinese Office Action issued Dec. 9, 2005 in the Chinese Patent Application No. 200410001230.6 which corresponds to the U.S. Appl. No. 10/704,537.

* cited by examiner

*Primary Examiner*—Shawn An
(74) *Attorney, Agent, or Firm*—Staas & Halsey LLP

(57) ABSTRACT

An advanced noise estimation method is provided. The noise estimation method includes calculating motion compensation information of the input picture at a first resolution, calculating the motion compensation information of the input picture at a second resolution, and based on the motion compensation information at the first resolution and the motion compensation information at the second resolution, estimating the noise of the input picture.

16 Claims, 9 Drawing Sheets

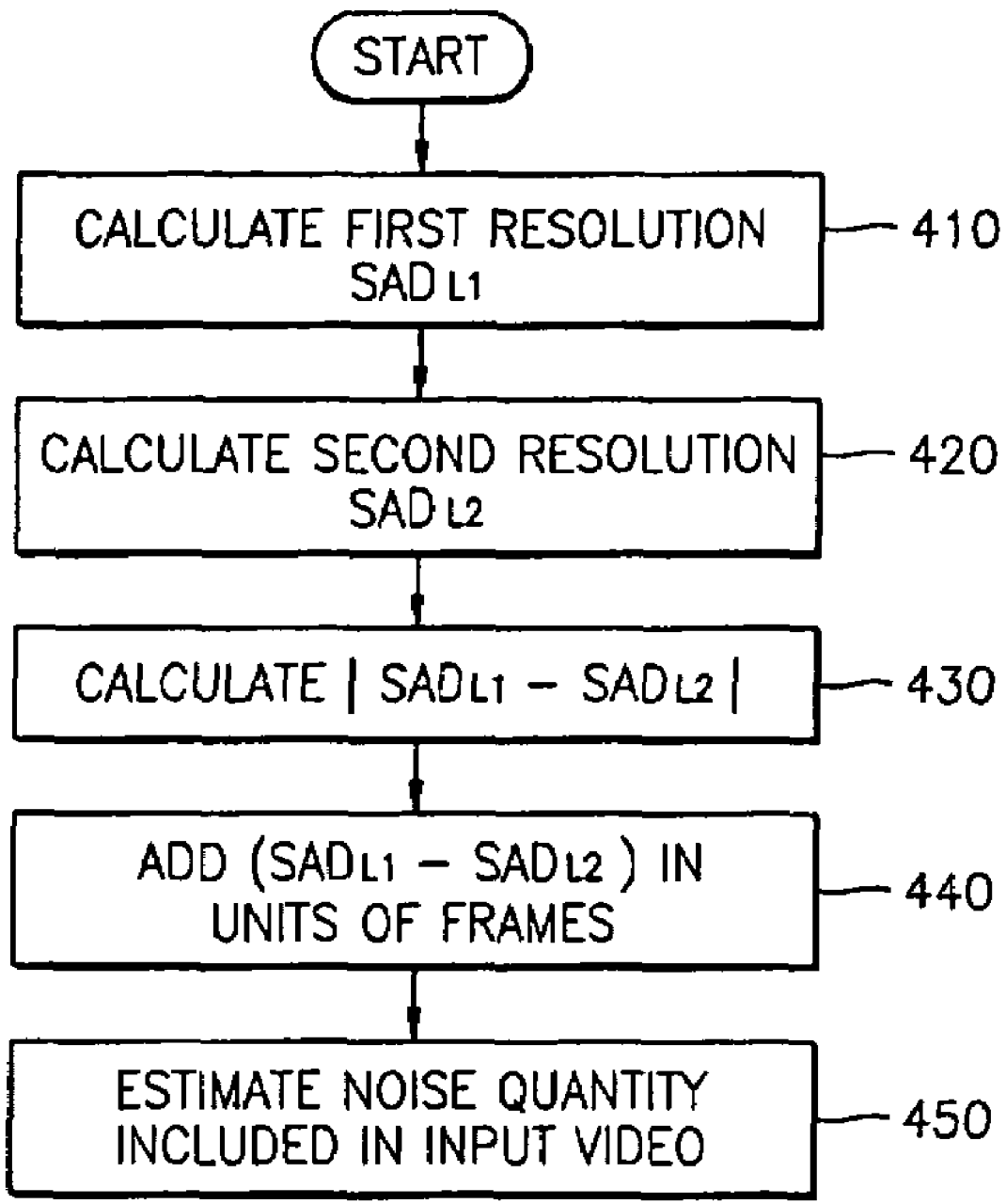

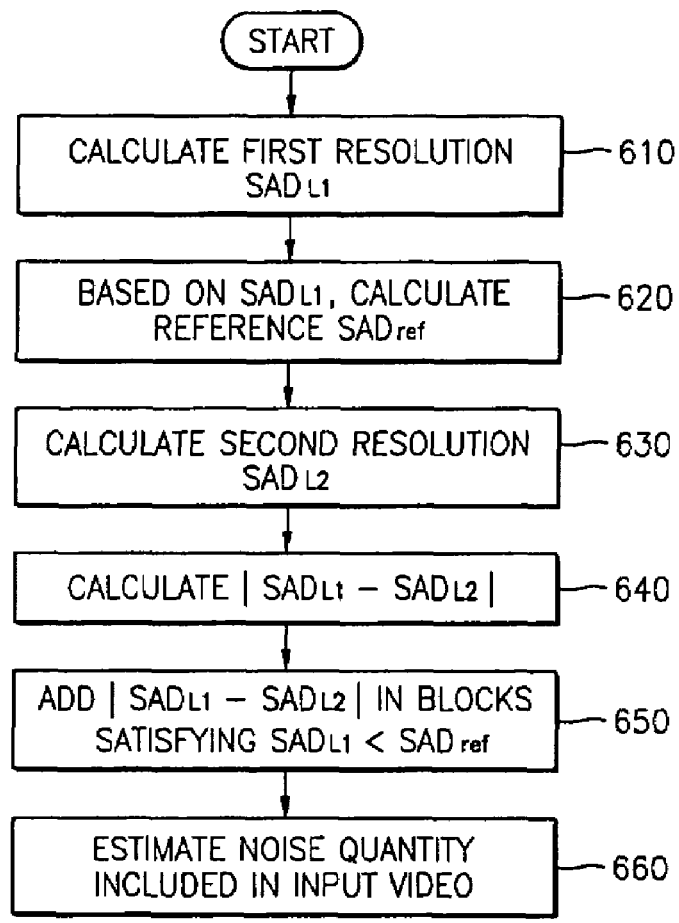
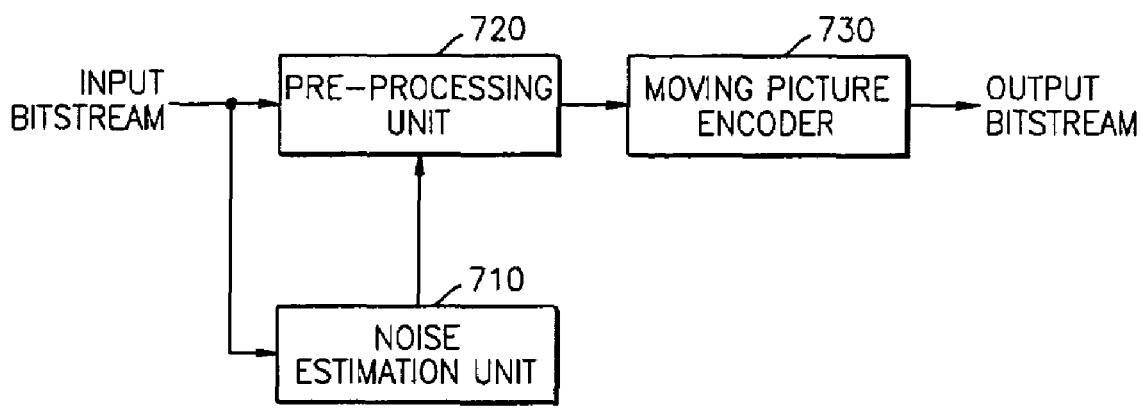

ADVANCED NOISE ESTIMATION METHOD AND APPARATUS BASED ON MOTION COMPENSATION, AND METHOD AND APPARATUS TO ENCODE A VIDEO USING THE SAME

CROSS-REFERENCE TO RELATED APPLICATIONS

This application claims the priority of Korean Patent Application No. 2003-46, filed Jan. 2, 2003, in the Korean Intellectual Property Office, the disclosure of which is incorporated herein in its entirety by reference.

BACKGROUND OF THE INVENTION

1. Field of the Invention

The present invention relates to a noise estimation method and apparatus, and more particularly, to a method and apparatus to effectively reduce noise by estimating the noise when a video signal distorted by the noise is input to a video encoder based on motion compensation (MC) and a discrete cosine transform (DCT), for example an encoder, such as a moving picture experts group (MPEG)-2 or MPEG-4 encoder.

2. Description of the Related Art

Recently, receivers, such as set-top boxes and other products that receive analog ground wave broadcasting have been introduced, which use a compression method, such as the MPEG-2 or MPEG-4, to encode and store the broadcasting. However, image signals that are input to the receiver are frequently distorted by a variety of noises, including white Gaussian noise, caused by transmission channels.

For example, an entire image signal is distorted by the variety of noises, including the white Gaussian noise. If the image signal is compressed as is, the compression efficiency is degraded due to the noises.

Accordingly, much research on ways to reduce the noise in the image signals has been performed. However, conventional methods to reduce the noise basically assume that a degree of noise is known to some extent, and, accordingly, a variety of methods for estimating noise are employed.

An example of these noise estimation methods is disclosed in European Patent No. 0712554.

Referring to FIG. 1, a conventional method to reduce the noise will now be explained.

FIG. 1 is a block diagram showing a conventional noise estimation apparatus. The conventional noise estimation apparatus includes a first subtractor 112, a frame memory 114, a first absolute value calculator 116, a first low pass filter 118, a second low pass filter 120, a second subtractor 122, a second absolute value calculator 124, a third subtractor 126, a third absolute value calculator 128, an adder 130, and a noise quantity estimation unit 132.

First, the first subtractor 112 calculates a first difference value between two neighboring pictures, based on a current input picture and a neighboring picture from the frame memory 114. The calculated difference value between the neighboring pictures is input to the first absolute value calculator 116. The first absolute value calculator 116 calculates an absolute value of the difference value calculated in the first subtractor 112 and outputs a result indicative thereof to the third subtractor 126.

Meanwhile, the second subtractor 122 calculates a second difference value between the current input picture, which is input through the first low pass filter 118, and the neighboring picture which is input through the second low pass filter 120. The calculated difference value, which is low pass filtered, is input to the second absolute value calculator 124. The second absolute value calculator 124 calculates the absolute value of the second difference value calculated in the second subtractor 122 and outputs a result indicative thereof to the third subtractor 126.

The third subtractor 126 calculates a third difference value of the inputs from the first absolute value calculator 116 and the second absolute value calculator 124, and inputs the calculated difference value to the third absolute value calculator 128. The third absolute value calculator 128 calculates the absolute value of the third difference value calculated in the third subtractor 126, and outputs a result indicative thereof to the adder 130.

The adder 130 adds the absolute value, which is output from the third absolute value calculator 128, in units of frames.

The noise quantity estimation unit 132 determines a quantity of noise included in the input picture, based on the value obtained by the adder 130.

If the value calculated in units of frames by the adder 130 is large, the conventional noise estimation apparatus 100 determines that there is a large amount of noise, and if the value is small, the conventional noise estimation apparatus 100 determines that there is a small amount of noise.

However, though the conventional noise estimation apparatus can estimate noise in an almost motionless picture, the output value of the adder 130 becomes greater due to motion in a moving picture. Accordingly, it is very difficult to estimate the noise in the moving picture.

SUMMARY OF THE INVENTION

The present invention provides an advanced noise estimation method and apparatus to efficiently estimate noise by using motion information.

The present invention also provides a video encoder and encoding apparatus using the advanced noise estimation method and apparatus.

Additional aspects and advantages of the invention will be set forth in part in the description which follows and, in part, will be obvious from the description, or may be learned by practice of the invention.

According to an aspect of the present invention, there is provided a method to estimate and/or reduce noise of an input picture including: calculating motion compensation information of the input picture at a first resolution; calculating the motion compensation information of the input picture at a second resolution; and based on the motion compensation information at the first resolution and the motion compensation information at the second resolution, estimating the noise of the input picture.

According to another aspect of the present invention, there is provided a discrete cosine transform (DCT)-based moving picture encoding method including: calculating motion compensation information of an input picture at a first resolution; calculating the motion compensation information of the input picture at a second resolution; based on the motion compensation information at the first resolution and the motion compensation information at the second resolution, estimating an amount of noise of the input picture; based on the amount of noise estimated, determining a modified quantization weight matrix; performing a DCT on the input picture; and performing a quantization on the DCT input picture data using the modified quantization weight matrix.

According to still another aspect of the present invention, there is provided an apparatus to estimate and/or reduce noise in an input picture including: a first motion compensation information calculation unit calculating motion compensation information of the input picture at a first resolution; a second motion compensation information calculation unit calculating the motion compensation information of the input picture at a second resolution; and a noise determination unit estimating, based on the motion compensation information at the first resolution and the motion compensation information at the second resolution, the noise of the input picture.

According to yet still another aspect of the present invention, there is provided a DCT-based moving picture encoding apparatus including: a first motion compensation information calculation unit calculating motion compensation information of an input picture at a first resolution; a second motion compensation information calculation unit calculating the motion compensation information of the input picture at a second resolution; a noise determination unit estimating, based on the motion compensation information at the first resolution and the motion compensation information at the second resolution, an amount of noise in the input picture; a quantization weight matrix determination unit determining a modified quantization weight matrix based on the amount of noise estimated; a discrete cosine transform (DCT) unit performing a DCT on the input picture; and a quantization unit performing a quantization on the DCT input picture data using the modified quantization weight matrix.

BRIEF DESCRIPTION OF THE DRAWINGS

The above and/or other aspects and/or advantages of the present invention will become more apparent by describing in detail aspects thereof with reference to the attached drawings in which:

FIG. 4 is a flowchart of operations performed by a noise estimation method, according to an aspect of the present invention;

FIG. 6 is a flowchart of the operations performed by the noise estimation method, according to another aspect of the present invention;

FIG. 7 is a block diagram of the noise estimation apparatus, according to still another aspect of the present invention;

DETAILED DESCRIPTION OF THE PREFERRED EMBODIMENTS

Figure 1:
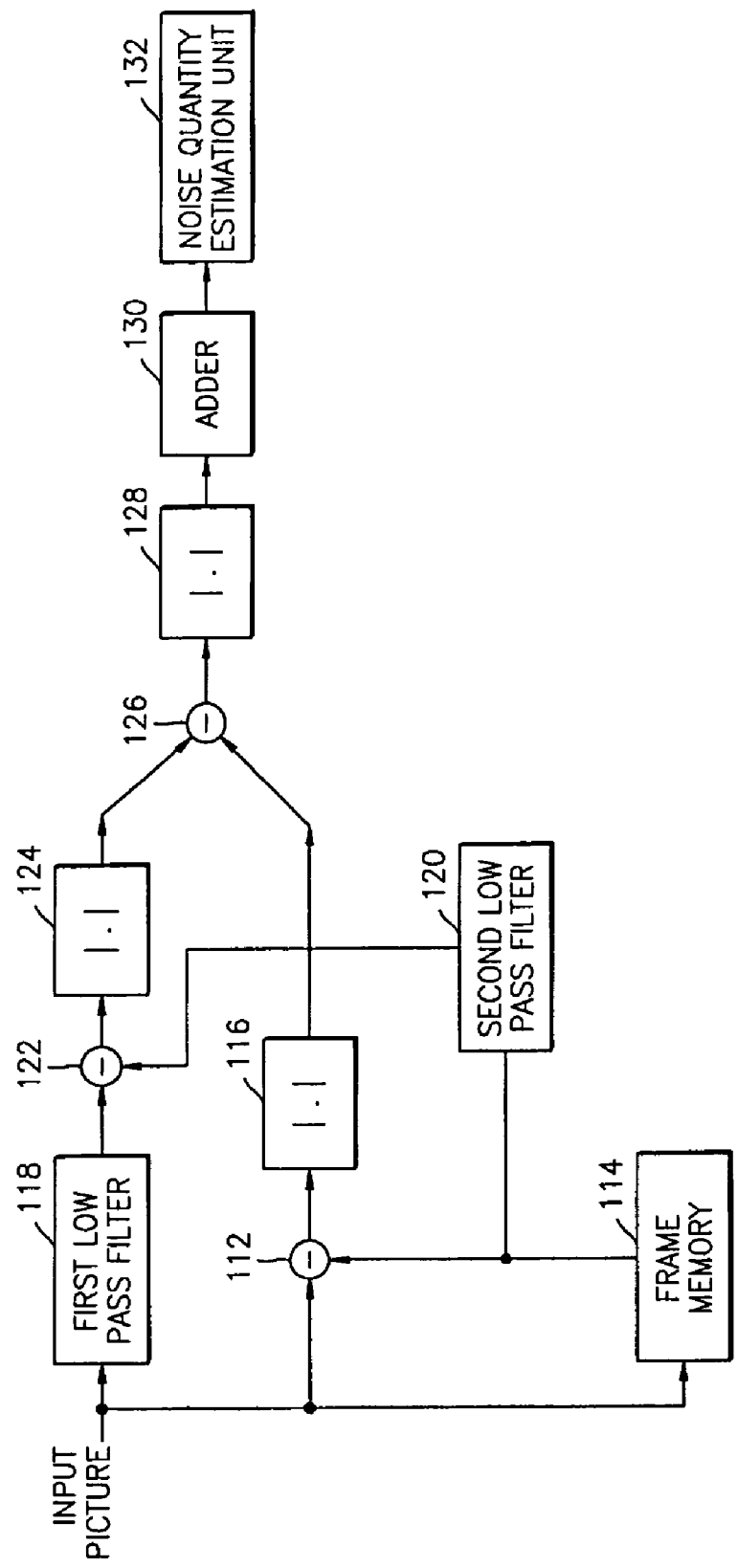
FIG. 1 is a block diagram showing a conventional noise estimation apparatus.

Reference will now be made in detail to the present aspects of the present invention, examples of which are illustrated in the accompanying drawings, wherein like reference numerals refer to the like elements throughout. The aspects are described below in order to explain the present invention by referring to the figures.

An advanced noise estimation method, according to an aspect of the present invention, will now be explained with reference to FIGS. 2 through 3B.

Figure 2:
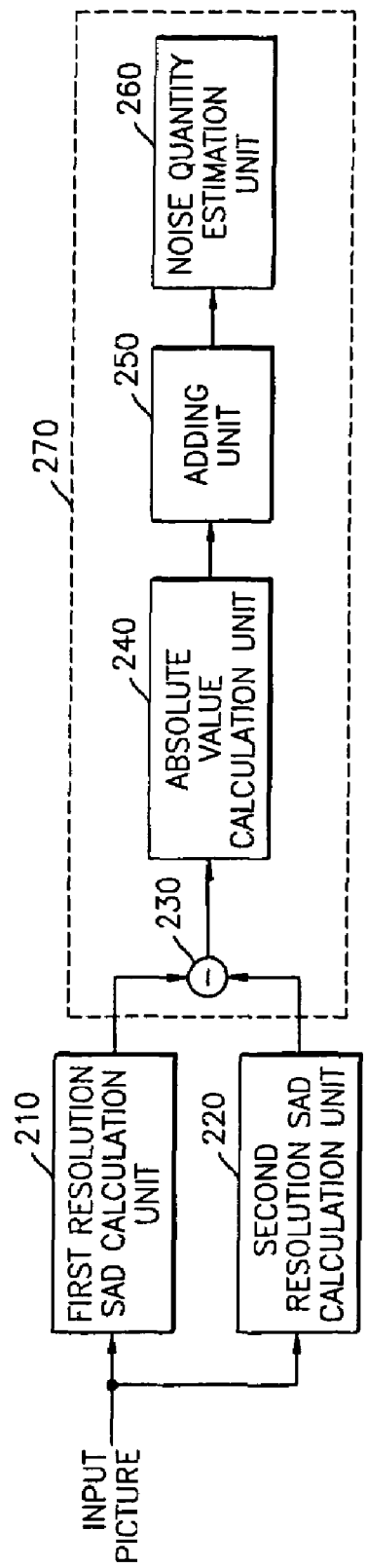
FIG. 2 is a block diagram showing a noise estimation apparatus, according to an aspect of the present invention.

FIG. 2 is a block diagram showing a noise estimation apparatus, according to an aspect of the present invention. The noise estimation apparatus shown in FIG. 2 includes a first resolution sum of absolute difference (SAD) calculation unit 210, a second resolution SAD calculation unit 220, and a noise determination unit 270.

The noise determination unit 270 includes a subtracting unit 230, an absolute value calculation unit 240, an adding unit 250, and a noise quantity estimation unit 260.

Figure 3A:
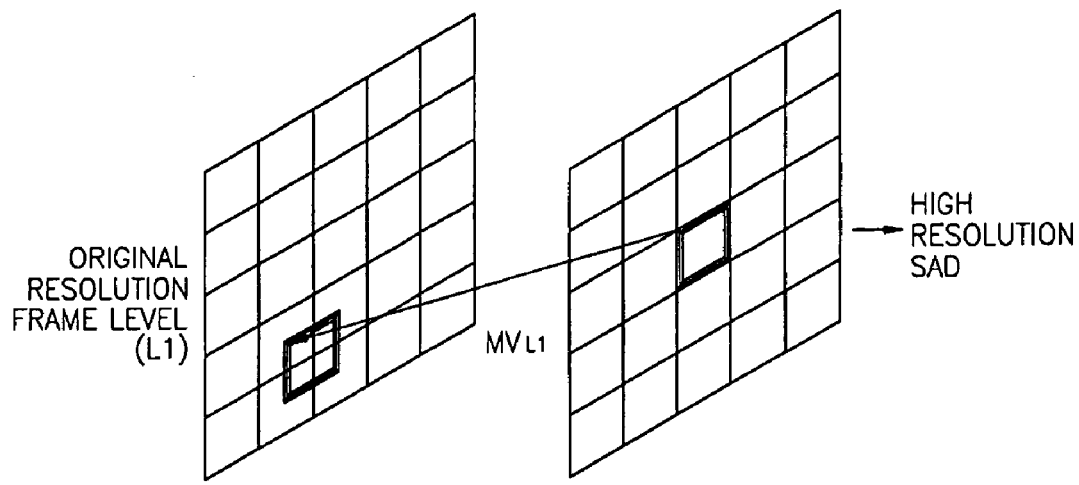
FIGS. 3A and 3B are diagrams illustrating a motion estimation method used in noise estimation, according to an aspect of the present invention.

As shown in FIG. 3A, the first resolution SAD calculation unit 210 searches through a search range of a previous frame for a motion vector $MV_{L1}$ corresponding to a block at a location (i, j) of a current frame at a first resolution. Then, the first resolution SAD calculation unit 210 outputs to the subtracting unit 230 a SAD corresponding to the motion vector $MV_{L1}$ searched for, that is, a difference value $SAD_{L1}$ between corresponding pels after moving by the $MV_{L1}$ from the previous frame. In an aspect of the present invention, the first resolution is defined as an original resolution level of an original input picture.

The motion vector $MV_{L1}$ at the first resolution is determined by equation 1 below:

$$MV_{L1} = \arg - S \leq \overset{\min}{p},\qquad(1)$$

$$q \leq S \sum_{m=0}^{N-1} \sum_{n=0}^{N-1} |F_n(i+m, j+n) - F_{n-1}(i+m+p, j+n+q)|$$

Here, $F_n(i, j)$ denotes a pel at location (i, j) in the current frame (n-th frame), that is, the pel in a current block marked by a thick line as shown in FIG. 3A. Also, ±S indicates a search region in which the motion vector is searched for. $F_{n-1}(i, j)$ denotes the pel at the location (i, j) in the previous frame ((n−1)-th frame). A size of each block is N×N.

Figure 3B:
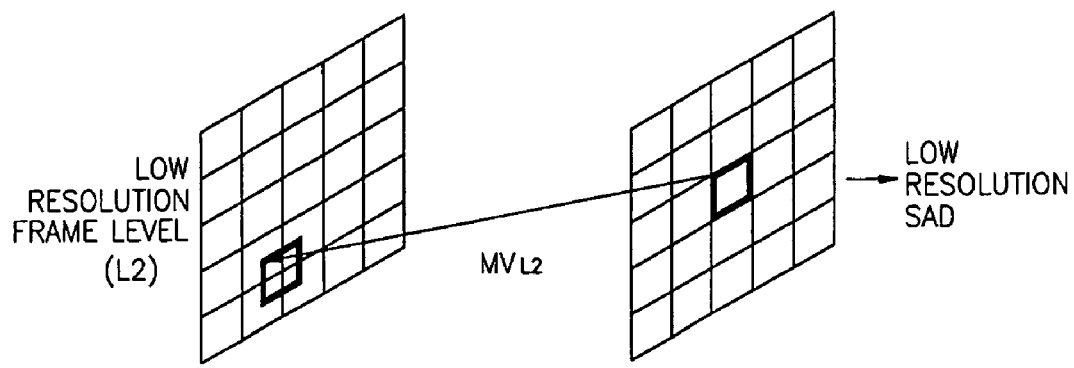

As shown in FIG. 3B, the second resolution SAD calculation unit 220 searches through the search range of the previous frame for a motion vector $MV_{L2}$ corresponding to the block at the location (i, j) of the current frame at a second resolution. Then, the second resolution SAD calculation unit 220 outputs to the subtracting unit 230 the SAD corresponding to the motion vector $MV_{L2}$ searched for, that is, a difference value $SAD_{L2}$ between the corresponding pels after moving by the $MV_{L2}$ from the previous frame. In an aspect of the present invention, the second resolution is defined as a low resolution level of the original input picture.

In addition, the low resolution level is obtained by performing low pass filtering of the original picture, in accordance with an aspect of the present invention. However, a frame, which is obtained by reducing a frame size through sub-sampling after performing the low pass filtering of the original picture, can also be used as a low resolution frame.

At the first resolution, a motion vector is calculated for each 16×16 block. At the second resolution, sub-sampling of a width and a length by ½ of each frame is performed and the motion vector of 8×8 blocks corresponding to the 16×16 blocks of the first resolution is obtained.

The subtracting unit 230 calculates a difference between $SAD_{L1}$ obtained in the first resolution SAD calculation unit 210 and $SAD_{L2}$ obtained in the second resolution SAD calculation unit 220, and the absolute value calculation unit 240 obtains an absolute value of the difference between $SAD_{L1}$ and $SAD_{L2}$, calculated in the subtracting unit 230.

That is, the subtracting unit 230 and the absolute value calculation unit 240 calculate the absolute value, that is, $SAD\_DIFF_k$, of the difference between $SAD_{L1}$ and $SAD_{L2}$ for a k-th block that is currently considered according to equation 2 below:

$$SAD\_DIFF_k=|SAD_{L1}-SAD_{L2}| \quad (2)$$

If the frame size at the second resolution is a fourth of the frame size at the first resolution, $SAD\_DIFF_k$ is obtained according to equation 3 below:

$$SAD\_DIFF_k=|SAD_{L1}-4\times SAD_{L2}| \quad (3)$$

The adding unit 250 adds together all SAD_DIFF's for all blocks in the current frame, and outputs the addition result, TOTAL_OF_SAD_DIFF, to the noise quantity estimation unit 260.

The noise quantity estimation unit 260 estimates a quantity of noise, based on the value TOTAL_OF_SAD_DIFF input from the adding unit 250.

Information on the noise quantity estimated in the noise quantity estimation unit 260 is sent to a noise reduction filtering unit (not shown). The noise reduction filtering unit performs a heavy noise reduction filtering of the frame having a large TOTAL_OF_SAD_DIFF value, and performs a light noise reduction filtering of the frame having a small TOTAL_OF_SAD_DIFF value, such that noise reduction filtering is effectively performed.

Though two resolution operations, i.e., the original resolution and the low resolution, are used in the present aspect, more than two resolution operations may be used in the present invention.

FIG. 4 is a flowchart of the operations performed by a noise estimation method, according to an aspect of the present invention.

In operation 410, at the first resolution, the motion vector $MV_{L1}$, which corresponds to a block at location (i, j) of the current frame, is searched for in the search range of the previous frame. Then, the SAD corresponding to the motion vector $MV_{L1}$ searched for, that is, the difference value $SAD_{L1}$ between corresponding pels after moving by the $MV_{L1}$ from the previous frame, is calculated.

In operation 420, at the second resolution, the motion vector $MV_{L2}$ corresponding to the block at the location (i, j) of the current frame is searched for in the search range of the previous frame. Then, the SAD corresponding to the motion vector $MV_{L2}$ searched for, that is, the difference value $SAD_{L2}$ between the corresponding pels after moving by $MV_{L2}$ from the previous frame, is calculated.

In operation 430, for a k-th block that is currently considered, the difference between $SAD_{L1}$ calculated in operation 410 and $SAD_{L2}$ calculated in operation 420 is calculated, and then, the absolute value of the calculated difference between the $SAD_{L1}$ and the $SAD_{L2}$, that is, $SAD\_DIFF_k$, is obtained using equation 2 or equation 3.

In operation 440, a quantity obtained by adding together all SAD_DIFF's for all the blocks in the current frame, that is, TOTAL_SAD_DIFF, is calculated.

In operation 450, based on the TOTAL_SAD_DIFF calculated in operation 440, the noise quantity of the input picture is estimated.

Figure 5:
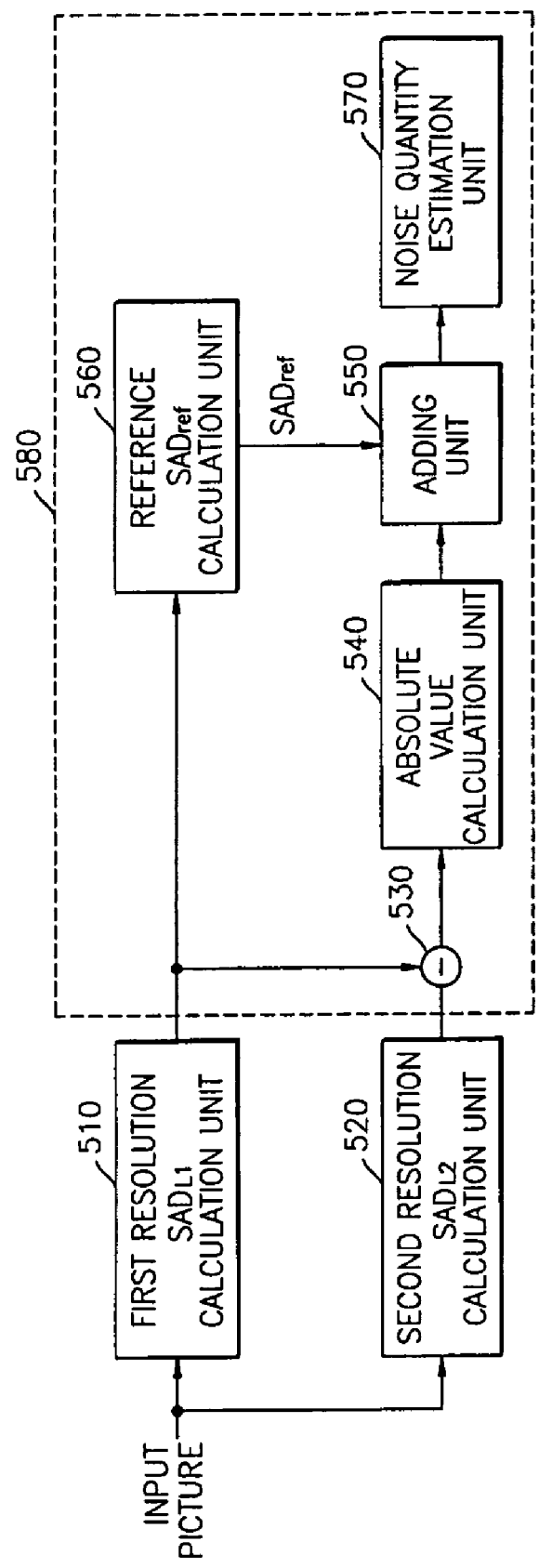
FIG. 5 is a block diagram of the noise estimation apparatus, according to another aspect of the present invention.

FIG. 5 is a block diagram of the noise estimation apparatus, according to another aspect of the present invention.

The noise estimation apparatus of FIG. 5 includes a first resolution $SAD_{L1}$ calculation unit 510, a second resolution $SAD_{L2}$ calculation unit 520, and a noise determination unit 580.

The noise determination unit 580 includes a subtracting unit 530, an absolute value calculation unit 540, an adding unit 550, a reference $SAD_{ref}$ calculation unit 560, and a noise quantity estimation unit 570.

Here, because the first resolution $SAD_{L1}$ calculation unit 510, the second resolution $SAD_{L2}$ calculation unit 520, the subtracting unit 530, the absolute value calculation unit 540, and the noise quantity estimation unit 570 perform the same functions as the corresponding functional units of FIG. 2, detailed explanations thereof will be omitted.

Based on the SAD values for the respective blocks output from the first resolution $SAD_{L1}$ calculation unit 510, the reference $SAD_{ref}$ calculation unit 560 calculates a reference SAD, that is, $SAD_{ref}$, according to equation 4 or equation 5 below:

$$SAD_{ref} = \frac{A}{K}\sum_K SAD_{LI} \quad (4)$$

where A is a predetermined constant.

$$SAD_{ref} = \frac{A}{K}\sum_K SAD_{half\text{-}pel} \quad (5)$$

where A is a predetermined constant, and $SAD_{half\text{-}pel}$ denotes the SAD after a half-pel search finishes.

The adding unit 550 adds only one SAD or a $SAD_{half\text{-}pel}$ value that is less than the reference SAD obtained by equation 4 or equation 5 in each block, calculates the SAD value for the frame, that is, TOTAL_OF_SAD_DIFF, and sends the SAD value for the frame to the noise quantity estimation unit 570.

Thus, the SADs of the blocks having the SAD which is much greater than the reference $SAD_{ref}$, i.e., the average SAD of the previous frame at the original resolution, are excluded when the SADs are added, because when SADs are added, noise estimation can be more accurately performed by removing the SADs of blocks for which the motion estimation is not accurately performed. The noise estimation unit 570 estimates the quantity of noise, based on the TOTAL_OF_SAD_DIFF value sent by the SAD adding unit 550.

Information on the noise quantity estimated in the noise quantity estimation unit 570 is sent to a noise reduction filtering unit (not shown). The noise reduction filtering unit performs heavy noise reduction filtering for the frame having a large TOTAL_OF_SAD_DIFF value, and performs light noise reduction filtering for the frame having a small TOTAL_OF_SAD_DIFF value, such that noise reduction filtering is effectively performed.

FIG. 6 is a flowchart of the operations performed by the noise estimation method, according to another aspect of the present invention.

At operation 610, at a first resolution, the motion vector $MV_{L1}$ corresponding to the block at the location (i, j) of the current frame is searched for in the search range of the previous frame. Then, the SAD corresponding to the motion vector $MV_{L1}$ searched for, that is, the difference value $SAD_{L1}$ between corresponding pels after moving by the $MV_{L1}$ from the previous frame, is calculated.

At operation 620, based on the difference value $SAD_{L1}$ between corresponding pels calculated in operation 610, the reference SAD, that is, $SAD_{ref}$, is calculated according to equation 3 or 4. In the present aspect, the $SAD_{ref}$ obtained in the current frame is used to estimate the noise for the immediately next frame.

At operation 630, at a second resolution, the motion vector $MV_{L2}$ corresponding to the block at the location (i, j) of the current frame is searched for in the search range of the previous frame. Then, the SAD corresponding to the motion vector $MV_{L2}$ searched for, that is, the difference value $SAD_{L2}$ between corresponding pels after moving by the $MV_{L2}$ from the previous frame, is calculated.

At operation 640, for a k-th block that is currently considered, the difference between $SAD_{L1}$ calculated in operation 610 and the $SAD_{L2}$ calculated in operation 630 is calculated, and then, the absolute value of the calculated difference between the $SAD_{L1}$ and the $SAD_{L2}$, that is, the $SAD\_DIFF_k$, is obtained using equation 2.

At operation 650, the SAD_DIFF's of the blocks satisfying $SAD_{L1} < SAD_{ref}$ among all blocks in the frame are all added together to calculate TOTAL_OF_SAD_DIFF.

At operation 660, based on the TOTAL_OF_SAD_DIFF value calculated in operation 650, the noise quantity of the input picture is estimated.

FIG. 7 is a block diagram of an example where a noise estimation unit 710, according to an aspect of the present invention, is applied to a moving picture encoding.

The noise estimation unit 710 estimates the quantity of noise included in an input picture, based on the embodiments of FIG. 2 or FIG. 5, and outputs the information of the estimated noise quantity to the pre-processing unit 720.

Because the moving picture encoder 730 performs the same function as an ordinary moving picture encoder, a detailed description thereof will not be repeated here.

Figure 8:
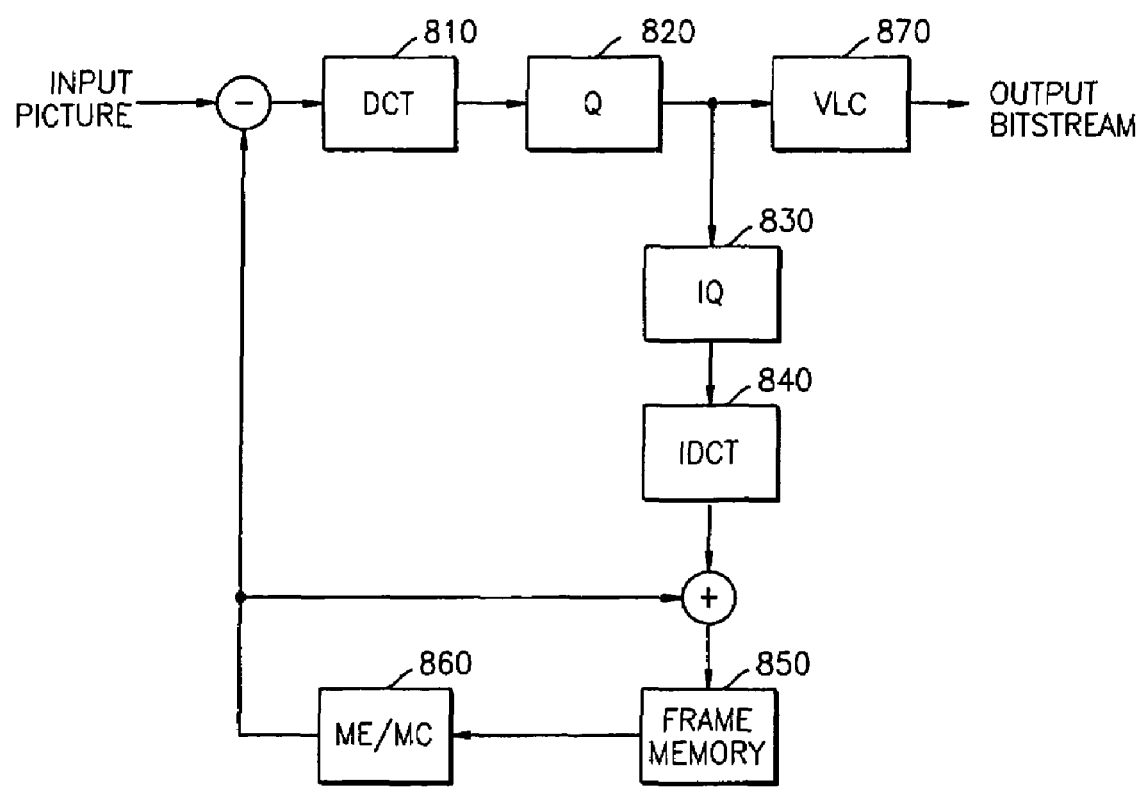
FIG. 8 is a block diagram showing an ordinary MPEG video encoder.

FIG. 8 is a block diagram showing an ordinary encoder to encode moving pictures.

The encoder performs a function to generate an encoded bitstream using a compression technology for video on demand (VOD) service or video communications.

First, in order to remove spatial correlation, a discrete cosine transform (DCT) unit 810 performs a DCT operation on the video data being input in units of 8×8 pel blocks. The quantization unit (Q) 820 performs a quantization on DCT coefficients obtained in the DCT unit 810 and expresses the coefficients by a small number of representative values such that high-efficiency loss compression is performed.

An inverse quantization (IQ) unit 830 inverse quantizes picture data quantized in the quantization unit 820. An inverse DCT (IDCT) unit 840 performs an IDCT on the picture data, which is inversely quantized in the inverse quantization (IQ) unit 830. A frame memory 850 stores the picture data, which is IDCT transformed in the IDCT unit 840, in units of frames.

A motion estimation and compensation (ME/MC) unit 860 estimates a motion vector (MV) and an SAD, which corresponds to a block matching error, for each macroblock, by using the picture data of a current frame being input and the picture data of the previous frame stored in the frame memory 850.

A variable length coding (VLC) unit 870 removes statistical redundancy in the DCT transformed and quantized data, according to the motion vector estimated in the motion estimation and compensation unit 860.

Figure 9:
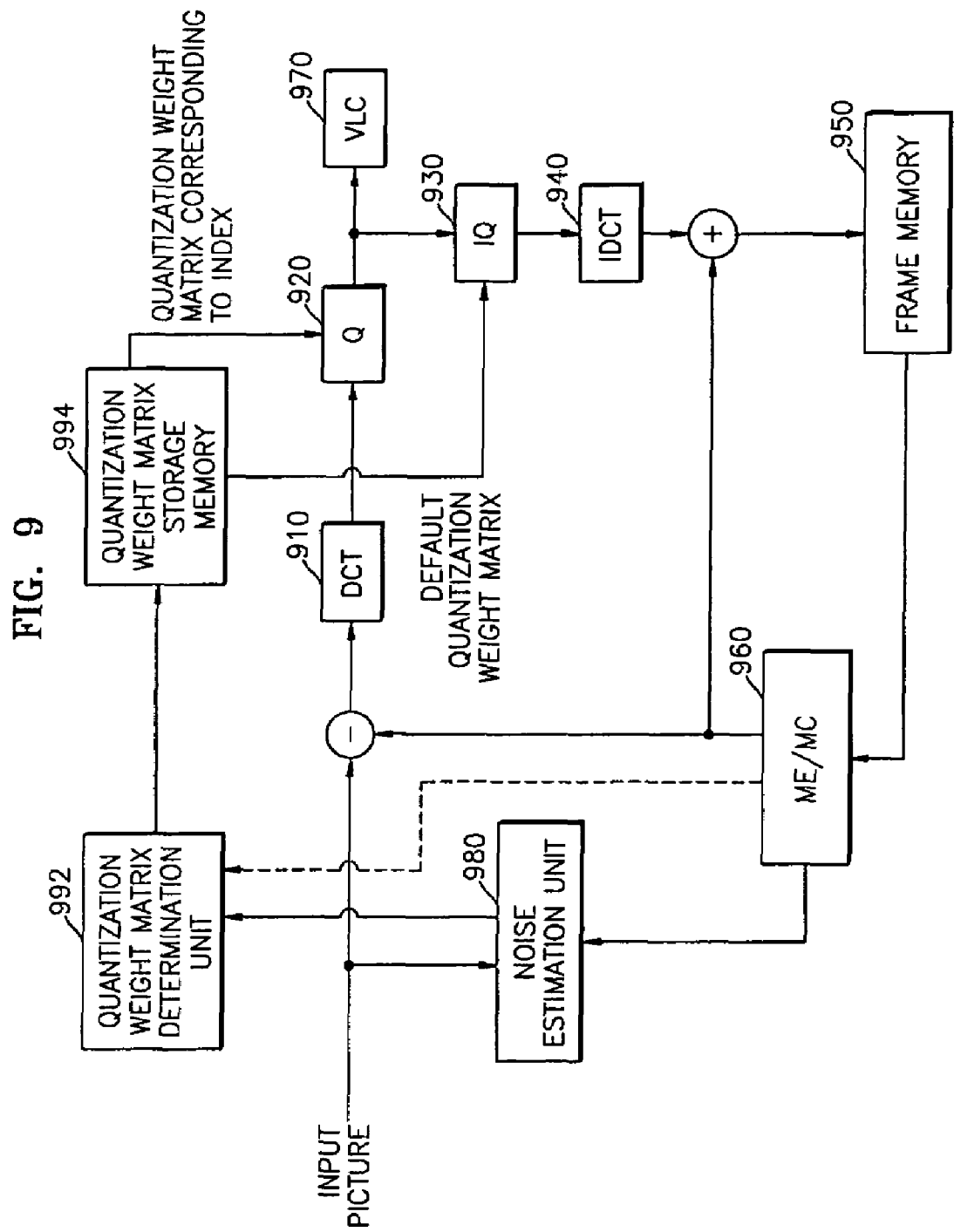
FIG. 9 is a block diagram showing an advanced video encoder, according to an aspect of the present invention.

FIG. 9 is a block diagram showing an advanced video encoder in which the noise estimation method, according to an aspect of the present invention, is applied to the ordinary moving picture encoder shown in FIG. 8.

The moving picture encoder employing the noise reduction method, according to an aspect of the present invention, combines a noise estimation unit 980, a quantization weight matrix determination unit 992, and a quantization weight matrix storage memory 994 with the ordinary moving picture encoder.

Because a DCT unit 910, an IDCT unit 940, a frame memory 950, a motion estimation and compensation unit 960, and a VLC unit 970 perform the same functions as in an ordinary moving picture encoder, a detailed description thereof will not be repeated here.

The noise estimation unit 980 estimates the quantity of noise included in an input picture, based on the aspects described in FIG. 2 or FIG. 4, and outputs the information of the estimated noise quantity to the quantization weight matrix determination unit 992.

The quantization weight matrix determination unit 992 determines a quantization weight matrix, based on the noise information sent by the noise estimation unit 980, and sends index information corresponding to the quantization weight matrix to the quantization weight matrix storage memory 994. Though the quantization weight matrix determination unit 992 determines a quantization weight matrix based on the noise information sent by the noise estimation unit 980 in the present aspect of the present invention, the variance from the motion estimation and compensation unit 960, which is calculated for each macroblock, may also be considered.

In the present embodiment, the quantization weight matrix storage memory 994 stores five quantization weight matrices classified according to the noise quantity included in an input picture.

Using the noise information sent by the noise estimation unit 980, the quantization weight matrix determination unit 992 sends an index of a modified quantization matrix corresponding to the noise information to the quantization weight matrix storage memory 994. When quantization weight matrices stored in the quantization weight matrix storage memory 994 are classified in five types, the index becomes one of 0, 1, 2, 3, and 4.

Based on the quantization weight matrix index input by the quantization weight matrix determination unit 992, the quantization weight matrix storage memory 994 selects a quantization weight matrix corresponding to the index and sends the selected matrix to the quantization unit 920. The quantization unit 920 performs the quantization using the input quantization weight matrix. The inverse quantization unit 930 performs an inverse quantization based on the original default quantization weight matrix.

Also, a user may arbitrarily determine new quantization weight matrices. Though noise reduction in the DCT region with respect to a Y component of an input picture block is described in the present aspect, the same apparatus may be applied to U and V components in addition to the Y component. At this time, additional weight matrices for the U and V components are needed.

Figure 10:
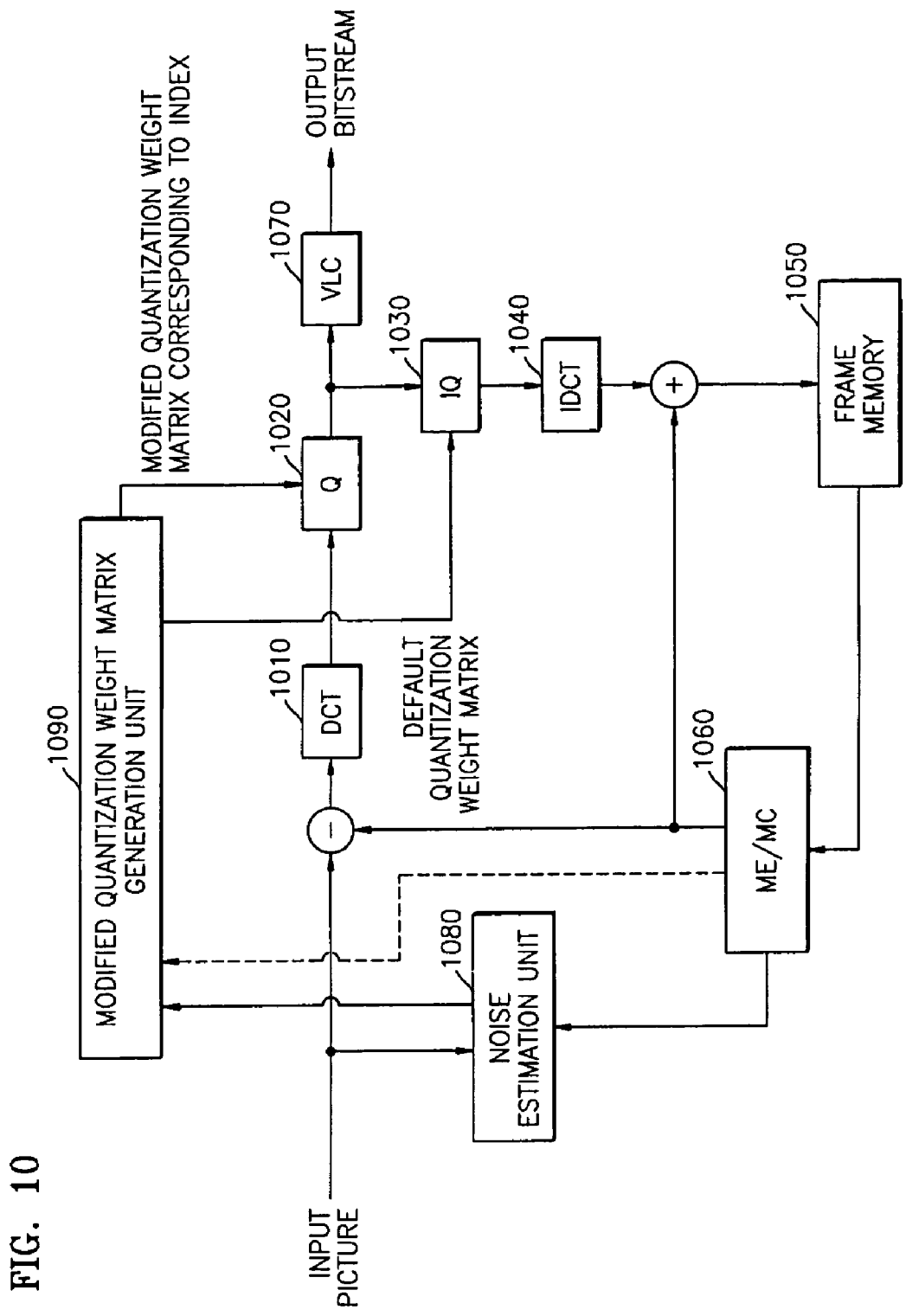
FIG. 10 is a block diagram showing the advanced video encoder, according to another aspect of the present invention.

FIG. 10 is a block diagram showing the advanced moving picture encoder employing a noise reduction method, according to another aspect of the present invention.

The moving picture encoder employing the noise reduction method, according to an aspect of the present inventions, combines a noise estimation unit 1080 and a modified quantization weight matrix generation unit 1090 with the ordinary moving picture encoder.

Because a DCT unit 1010, an IDCT unit 1040, a frame memory 1050, a motion estimation and compensation unit 1060, and a VLC unit 1070 perform the same functions as in the ordinary moving picture encoder of FIG. 8, a detailed description thereof will not be repeated here.

The noise estimation unit 1080 estimates the quantity of noise included in the input picture, based on the aspects described in FIG. 2 or FIG. 5, and outputs the information of the estimated noise quantity to the modified quantization weight matrix generation unit 1090.

The modified quantization weight matrix generation unit 1090 generates the modified quantization weight matrix, based on the noise information sent by the noise estimation unit 980, and sends the matrix to the quantization unit 1020. Though the modified quantization weight matrix generation unit 1090 determines a quantization weight matrix based on the noise information sent by the noise estimation unit 1080 in the present aspect, a macroblock variance from the motion estimation and compensation unit 1060, which is calculated for each macroblock, may also be considered. The quantization unit 1020 performs the quantization using the modified quantization weight matrix input from the modified quantization weight matrix generation unit 1090. The inverse quantization unit 1030 performs the inverse quantization based on the original default quantization weight matrix.

The present invention is not limited to the aspects described above, and it is apparent that variations and modifications by those skilled in the art can be effected within the spirit and scope of the present invention. In particular, the present invention may apply to all moving picture encoding apparatuses and methods, such as MPEG-1, MPEG-2, and MPEG-4.

The present invention may be embodied in a code, which can be read by a computer, on a computer readable recording medium. The computer readable recording medium may include all kinds of recording apparatuses on which computer readable data are stored. The computer readable recording media includes storage media such as magnetic storage media (e.g., ROM's, floppy disks, hard disks, etc.), optically readable media (e.g., CD-ROMs, DVDs, etc.) and carrier waves (e.g., transmissions over the Internet). Also, the computer readable recording media may be scattered on computer systems connected through a network and can store and execute a computer readable code in a distributed mode.

According to a noise estimation method and apparatus of the present invention as described above, a noise in an input picture can be more effectively estimated, and a moving picture encoding method and apparatus employing the noise estimation method and apparatus of the present invention can effectively reduce the noise in the input picture, such that encoding moving pictures can be more efficiently performed.

Although a few aspects of the present invention have been shown and described, it would be appreciated by those skilled in the art that changes may be made in this aspect without departing from the principles and spirit of the invention, the scope of which is defined in the claims and their equivalents.

What is claimed is:

1. A method to estimate and/or reduce noise of an input picture, comprising:
    calculating motion compensation information of the input picture at a first resolution;
    calculating the motion compensation information of the input picture at a second resolution; and
    based on the motion compensation information at the first resolution and the motion compensation information at the second resolution, estimating the noise of the input picture,
    wherein the motion compensation information is a sum of absolute difference (SAD), and the noise of the input picture is estimated based on a difference between the SAD at the first resolution and the SAD at the second resolution.

2. The method as recited in claim 1, wherein the first resolution is an original resolution and the second resolution is a low resolution.

3. The method as recited in claim 2, wherein the second resolution is obtained by performing low pass filtering.

4. The method as recited in claim 1, wherein the calculation of the motion compensation information is performed in units of blocks.

5. The method as recited in claim 1, wherein the estimation of the noise of the input picture further comprises:
    based on the SAD at the first resolution and the SAD at the second resolution, calculating a difference between the SAD at the first resolution and the SAD at the second resolution in each block of the input picture, and calculating an absolute value of the calculated SAD difference.

6. The method as recited in claim 5, wherein the estimation of the noise of the input picture further comprises:
    in each frame, adding the absolute value of each block calculated, and, based on the absolute value summed up in each frame, estimating an amount of noise in the input picture.

7. The method as recited in claim 6, wherein the calculating of the motion compensation information of the input picture at the first resolution further comprises:
    calculating a reference SAD based on the calculated SAD at the first resolution, and adding the absolute value calculated only when the SAD at the first resolution of the block is less than the reference SAD.

8. The method as recited in claim 1, further comprising:
    based on the noise information estimated, performing a noise reduction filtering of the input picture.

9. An apparatus to estimate and/or reduce noise in an input picture, comprising:
    a first motion compensation information calculation unit calculating motion compensation information of the input picture at a first resolution;
    a second motion compensation information calculation unit calculating the motion compensation information of the input picture at a second resolution; and
    a noise determination unit estimating, based on the motion compensation information at the first resolution and the motion compensation information at the second resolution, the noise of the input picture,
    wherein the motion compensation information is a sum of absolute difference (SAD), and the noise of the input picture is estimated based on a difference between the SAD at the first resolution and the SAD at the second resolution.

10. The apparatus as recited in claim 9, wherein the first resolution is an original resolution and the second resolution is a low resolution.

11. The apparatus as recited in claim 10, wherein the second resolution is obtained by performing low pass filtering.

12. The apparatus as recited in claim 9, wherein the second motion compensation information calculation unit calculates the motion compensation information in units of blocks.

13. The apparatus as recited in claim 9, wherein the noise determination unit further comprises:
    an SAD difference calculation unit calculating, based on the SAD at the first resolution and the SAD at the second resolution, a difference between the SAD at the first resolution and the SAD at the second resolution in each block of the input picture, and calculating an absolute value of the calculated SAD difference.

14. The apparatus as recited in claim 13, wherein the noise determination unit further comprises:

an adding unit adding the absolute value of each block calculated in the SAD difference calculation unit in each frame; and a noise quantity estimation unit estimating, based on the calculation result of the adding unit, an amount of noise in the input picture.

15. The apparatus as recited in claim 14, wherein the noise determination unit further comprises:

a reference SAD calculation unit calculating a reference SAD based on the SAD at the first resolution, wherein the adding unit adds the absolute value of the SAD difference of the block, only when the SAD at the first resolution of the block is less than the reference SAD.

16. The apparatus as recited in claim 9, further comprising:

a noise reduction unit performing noise reduction filtering on the input picture based on the estimated amount of noise.

\* \* \* \* \*